United States Patent
Zhao et al.

(10) Patent No.: US 11,265,581 B2
(45) Date of Patent: Mar. 1, 2022

(54) METHOD AND APPARATUS FOR VIDEO CODING

(71) Applicant: TENCENT AMERICA LLC, Palo Alto, CA (US)

(72) Inventors: Liang Zhao, Sunnyvale, CA (US); Xiang Li, Saratoga, CA (US); Xin Zhao, Santa Clara, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 1 day.

(21) Appl. No.: 16/998,553

(22) Filed: Aug. 20, 2020

(65) Prior Publication Data

US 2021/0058643 A1  Feb. 25, 2021

Related U.S. Application Data

(60) Provisional application No. 62/891,045, filed on Aug. 23, 2019.

(51) Int. Cl.
*H04N 19/70* (2014.01)
*H04N 19/107* (2014.01)
(Continued)

(52) U.S. Cl.
CPC ........... *H04N 19/70* (2014.11); *H04N 19/107* (2014.11); *H04N 19/176* (2014.11); *H04N 19/186* (2014.11); *H04N 19/50* (2014.11)

(58) Field of Classification Search
CPC .. H04N 19/107; H04N 19/176; H04N 19/186; H04N 19/50; H04N 19/61; H04N 19/70; H04N 19/91
(Continued)

(56) References Cited

U.S. PATENT DOCUMENTS

| | | | |
|---|---|---|---|
| 2013/0114673 A1* | 5/2013 | Chien | H04N 19/103 375/240.02 |
| 2015/0023405 A1* | 1/2015 | Joshi | H04N 19/593 375/240.02 |

(Continued)

FOREIGN PATENT DOCUMENTS

| | | | |
|---|---|---|---|
| CN | 112118448 A | * 12/2020 | |
| WO | WO-2020185799 A1 | * 9/2020 | H04N 19/186 |

(Continued)

OTHER PUBLICATIONS

Christian Helmrich, et al., CE7 Joint chroma residual coding with muittole modes (tests CE7-2.1, CE7-2,2), Video Experts Team (JVET) of ITU-T SG, of ITU-T SG 16 WP 3 and ISO/IEC JTC 1/SC 29/WG 11, 15th Meeting: Gothenburg, SE, Jul. 3-12, 2019, Document JVET-O0105-v2. 9 pgs.

(Continued)

*Primary Examiner* — Christopher S Kelley
*Assistant Examiner* — Kathleen M Walsh
(74) *Attorney, Agent, or Firm* — Oblon, McClelland, Maier & Neustadt, L.L.P.

(57) ABSTRACT

A method of video decoding can include determining a prediction mode of a current coding unit (CU), and determining values of a transform unit (TU) coded block flag (CBF) of a Cb transform block, denoted tu_cbf_cb, and a TU CBF of a Cr transform block, denoted tu_cbf_cr, determining a context index, denoted ctxIdx, based on the prediction mode of the current CU and the values of the tu_cbf_cb, and the tu_cbf_cr, and performing an arithmetic decoding process according to a context model indicated by the ctxIdx to determine a bin of a joint Cb Cr residual (JCCR) flag indicating whether residual samples for both Cb and Cr chroma components of the current CU are coded as a single transform block.

20 Claims, 12 Drawing Sheets

(51) Int. Cl.
*H04N 19/176* (2014.01)
*H04N 19/186* (2014.01)
*H04N 19/50* (2014.01)

(58) Field of Classification Search
USPC .................................................. 375/240.12
See application file for complete search history.

(56) References Cited

U.S. PATENT DOCUMENTS

| | | | | |
|---|---|---|---|---|
| 2015/0264405 | A1* | 9/2015 | Zhang | H04N 19/60 |
| | | | | 375/240.18 |
| 2018/0288437 | A1* | 10/2018 | Hsiang | H04N 19/186 |
| 2021/0006792 | A1* | 1/2021 | Han | H04N 19/176 |

FOREIGN PATENT DOCUMENTS

| | | | |
|---|---|---|---|
| WO | WO-2020253823 A1 | * | 12/2020 |
| WO | WO-2020253829 A1 | * | 12/2020 |

OTHER PUBLICATIONS

Christian Helmrich, et al., CE7-related: Alternative configuration for joint chrome residual coding, oint Video Exports Team (JVET) of ITU-T SG 16 WP3 and ISO/IEC JTC 1/SC 29/WG 11, 15th Meeting: Gothenburg, SE, Jul. 3-12, 2019. Document: JVET-O0543-v2, 8 pgs.

Benjamin Bross. et al., Versatile Video Coding (Draft 6), Joint Video Experts Team (JVET) of ITU-T SG 16 WP 3 and ISO/IEC JTC 1/SC 29/WG 11, 15th Meeting: Gothenburg, SE, Jul. 3-12, 2019. Document: JVET-O2001-vE, 456 pgs.

* cited by examiner

METHOD AND APPARATUS FOR VIDEO CODING

INCORPORATION BY REFERENCE

This present disclosure claims the benefit of priority to U.S. Provisional Application No. 62/891,045, "Improvement for Joint Chroma Residue Coding" filed on Aug. 23, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, am neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide a first method of video decoding at a video decoder. The method can include determining a prediction mode of a current coding unit (CU) including an inter prediction mode and an intra prediction mode, and determining values of the following syntax elements of the current CU: a transform unit (TU) coded block flag of a Cb transform block, denoted tu_cbf_cb, indicating whether the Cb transform block contains one or more transform coefficient levels not equal to zero, and a TU coded block flag of a Cr transform block, denoted tu_cbf_cr, indicating whether the Cr transform block contains one or more transform coefficient levels not equal to 0. The method can further include determining a context index, denoted ctxIdx, based on the prediction mode of the current CU and the values of the tu_cbf_cb, and the tu_cbf_cr, and performing an arithmetic decoding process according to a context model indicated by the ctxIdx to determine a bin of a joint Cb Cr residual (JCCR) flag indicating whether residual samples for both Cb and Cr chroma components of the current CU are coded as a single transform block.

In an embodiment, the current CU is coded in the inter prediction mode, one of the Cb transform block and the Cr transform block contains transform coefficient levels that are all zero, and the residual samples for both the Cb and Cr chroma components of the current CU are coded as the single transform block.

In an embodiment, a prediction mode flag indicating whether the current coding unit is coded in the inter prediction mode or the intra prediction mode is received or inferred. In an embodiment, the prediction mode of the current CU is determined to be the intra prediction mode in response to that the current CU is coded with an intra block copy (IBC) mode, or a combined intra and inter prediction (CP) mode. In an embodiment, the TU coded block flag of the Cb transform block or the Cr transform block is received or inferred.

In an embodiment, the context index is determined according to one of the following (1)-(4) sets of expressions:

$$ctxIdx=(2*tu\_cbf\_cb+tu\_cbf\_cr-1)+3*(isIntra?0:1), \quad (1)$$

$$cbfCbCr=2*tu\_cbf\_cb+tu\_cbf\_cr, ctxIdx= \\ (cbCbCr==3)?0:(cbfCbCr+2*(isIntra?0:1)), \quad (2)$$

$$cbfCbCr=2*tu\_cbf\_cb+tu\_cbf\_cr, ctxIdx= \\ (cbfCbCr==3)?0:((isIntra?cbfCbCr: 3)), \text{ and} \quad (3)$$

$$cbfbCr=2*tu\_cbf\_cb+tu\_cbf\_cr, ctxIdx= \\ (cbfCbCr==3)?0:(isIntra?1:2)), \quad (4)$$

where isIntra represents a Boolean value that is true when the current CU is coded with the intra prediction mode, and false when the current CU is coded with the inter prediction mode.

In an embodiment, the context index is determined based on decoded information of a neighboring block of the current CU. In an example, the decoded information of the neighboring block of the current CU includes one or more of a prediction mode of the neighboring block, a TU coded block flag of a Cb transform block of the neighboring block, a TU coded block flag of a Cb transform block of the neighboring block, or a size of the neighboring block.

Aspects of the disclosure provide a second method of video decoding at a video decoder. The method can include determining a size of a current CU, determining a context index, denoted ctxIdx, based on the size of the current CU, and performing an arithmetic decoding process according to a context model indicated by the ctxIdx to determine a bin of a joint Cb Cr residual (JCCR) flag indicating whether residual samples for both chroma components Cb and Cr of the current CU are coded as a single transform block.

In an embodiment, the size of the current CU is represented by one of a block width, a block height, a block area size, a sum of the block width and the block height, a maximum of the block width and the block height, or a minimum of the block width and the block height. In an example, a first context model is used when the block size of the current CU is smaller than a threshold, and a second context model is used when the block size of the current CU is greater than the threshold.

In an embodiment, the context index is derived based on the size of the current CU, a TU coded block flag of a Cb transform block, denoted tu_cbf_cb, of the current CU indicating whether the Cb transform block contains one or more transform coefficient levels not equal to zero, and a TU coded block flag of a Cr transform block, denoted tu_cbf_cr, of the current CU indicating whether the Cr transform block contains one or more transform coefficient levels not equal to 0.

In an example, the context index is derived according to $$ctxIdx=(2*tu\_cbf\_cb+tu\_cbf\_cr-1)+3*(blockSize<K?0:1),$$

where blocksize represents the size of the current CU, and K represents a threshold and is a positive integer, Aspects of the disclosure also provide non-transitory computer-readable media storing instructions which when executed by computers for video decoding cause the computers to perform the methods for video decoding disclosed herein.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Video Encoding and Decoding Systems

Figure 1:
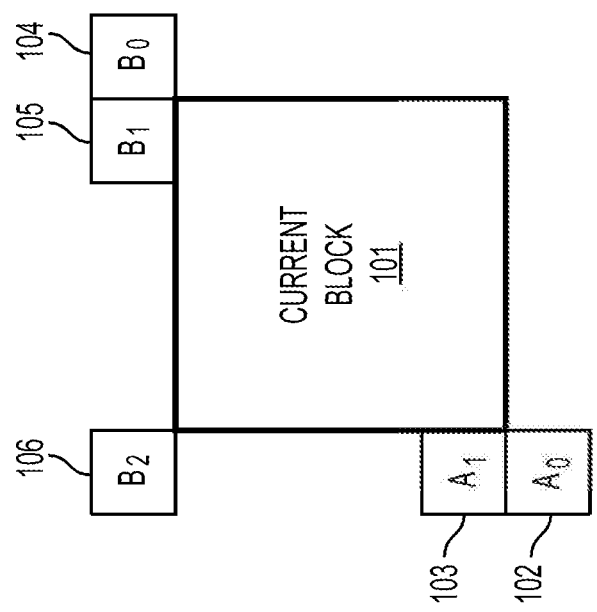
FIG. 1 is a schematic illustration of a current block and its surrounding spatial merge candidates in one example.
Figure 2:
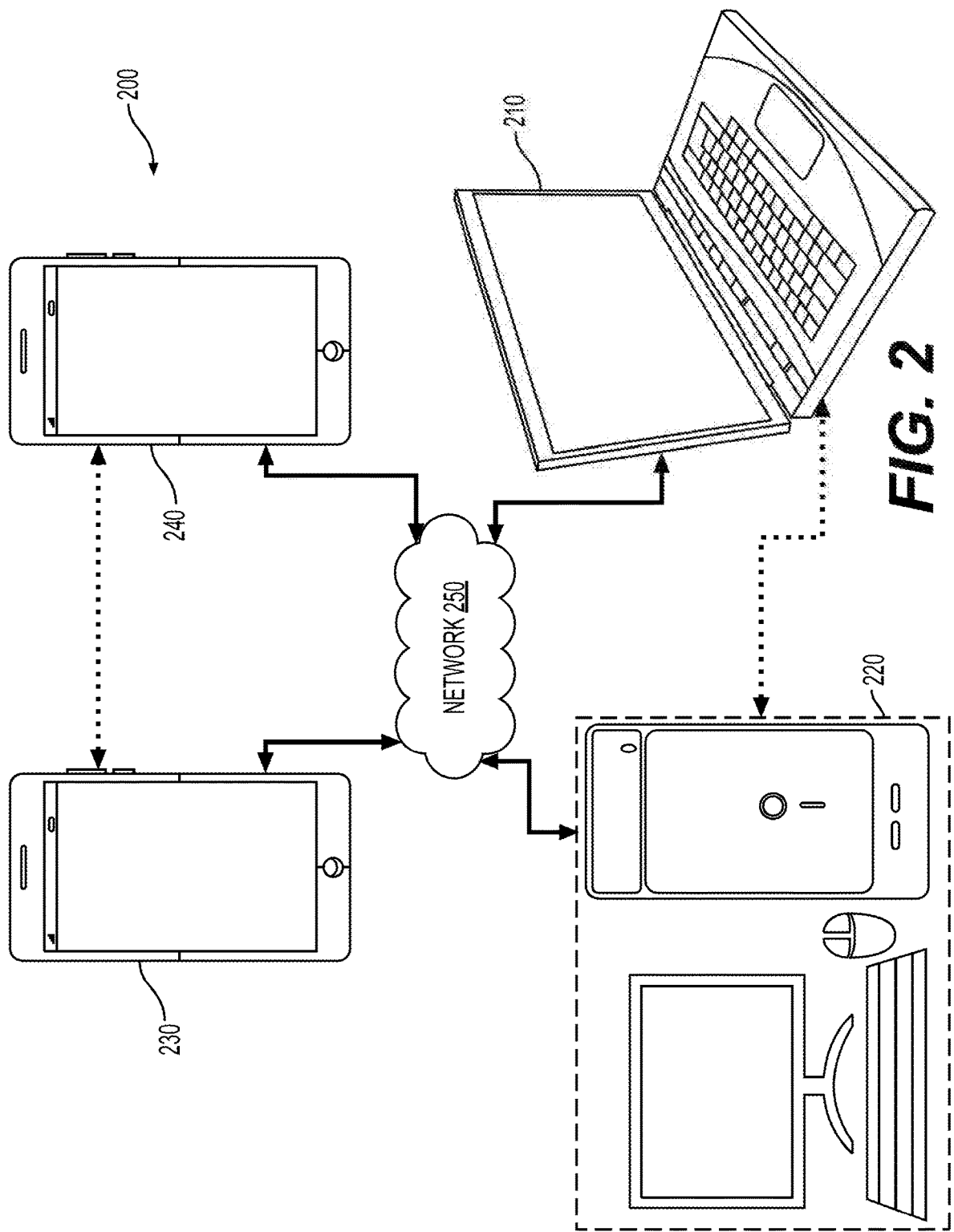
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
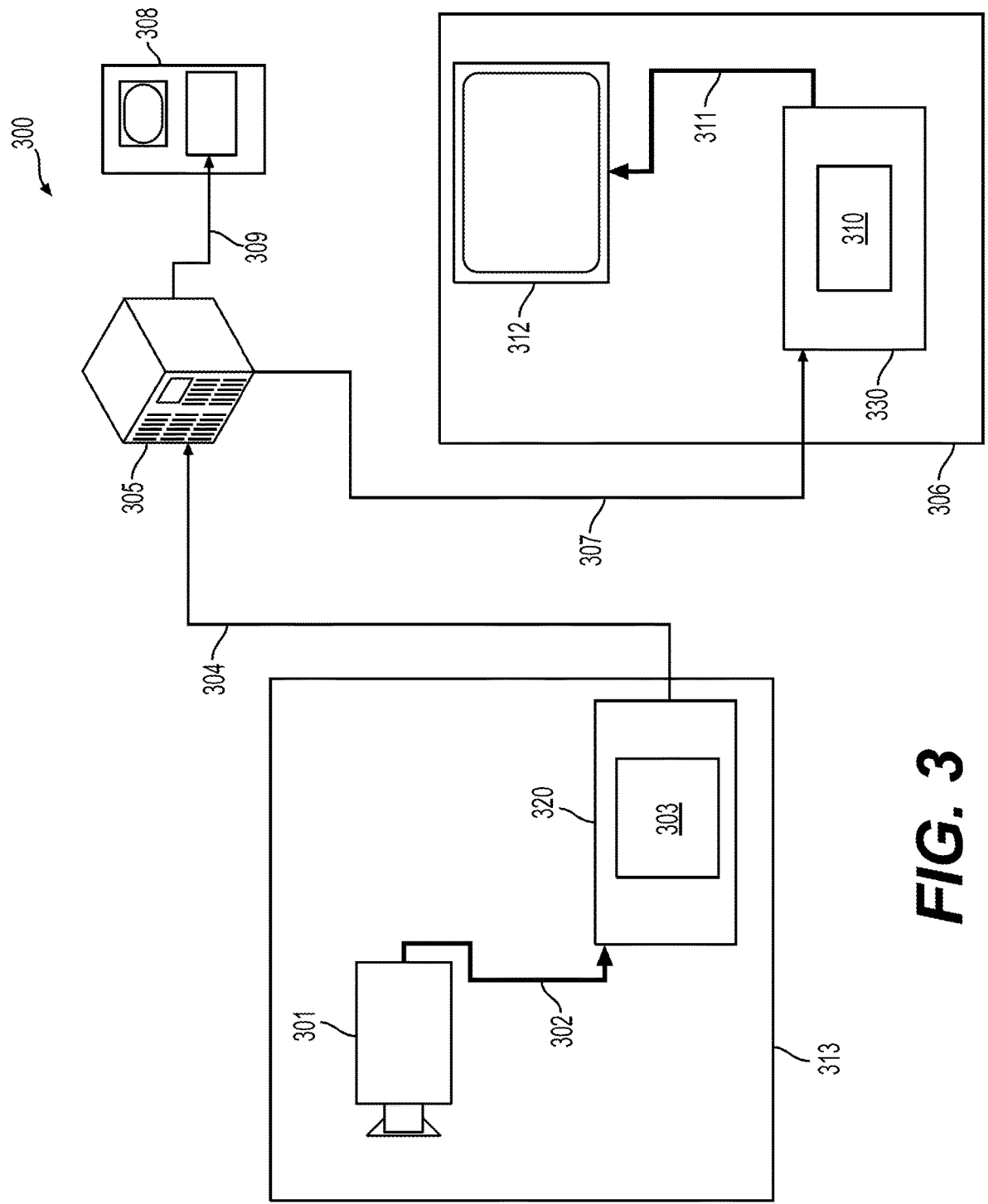
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304)(or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304)(or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309)(e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

Figure 4:
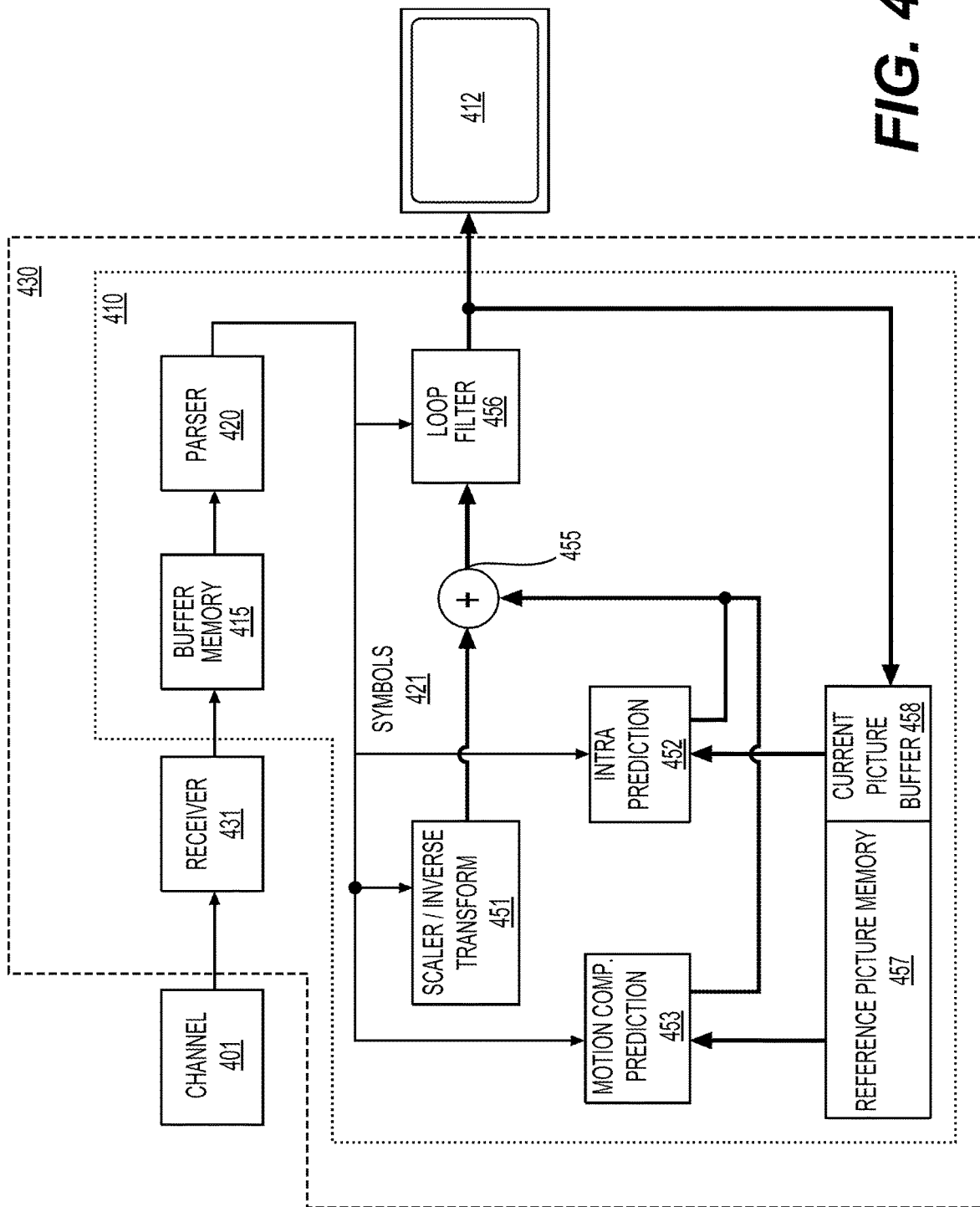
FIG. 4 is a schematic illustration of a simplified block diagram of a decoder in accordance with an embodiment.

It is noted that the electronic devices (320) and (330) can include other components (not shown). For example, the electronic device (320) can include a video decoder (not shown) and the electronic device (330) can include a video encoder (not shown) as well, FIG. 4 shows a block diagram of a video decoder (410) according to an embodiment of the present disclosure. The video decoder (410) can be included in an electronic device (430). The electronic device (430) can include a receiver (431)(e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420)("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412)(e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s)(421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
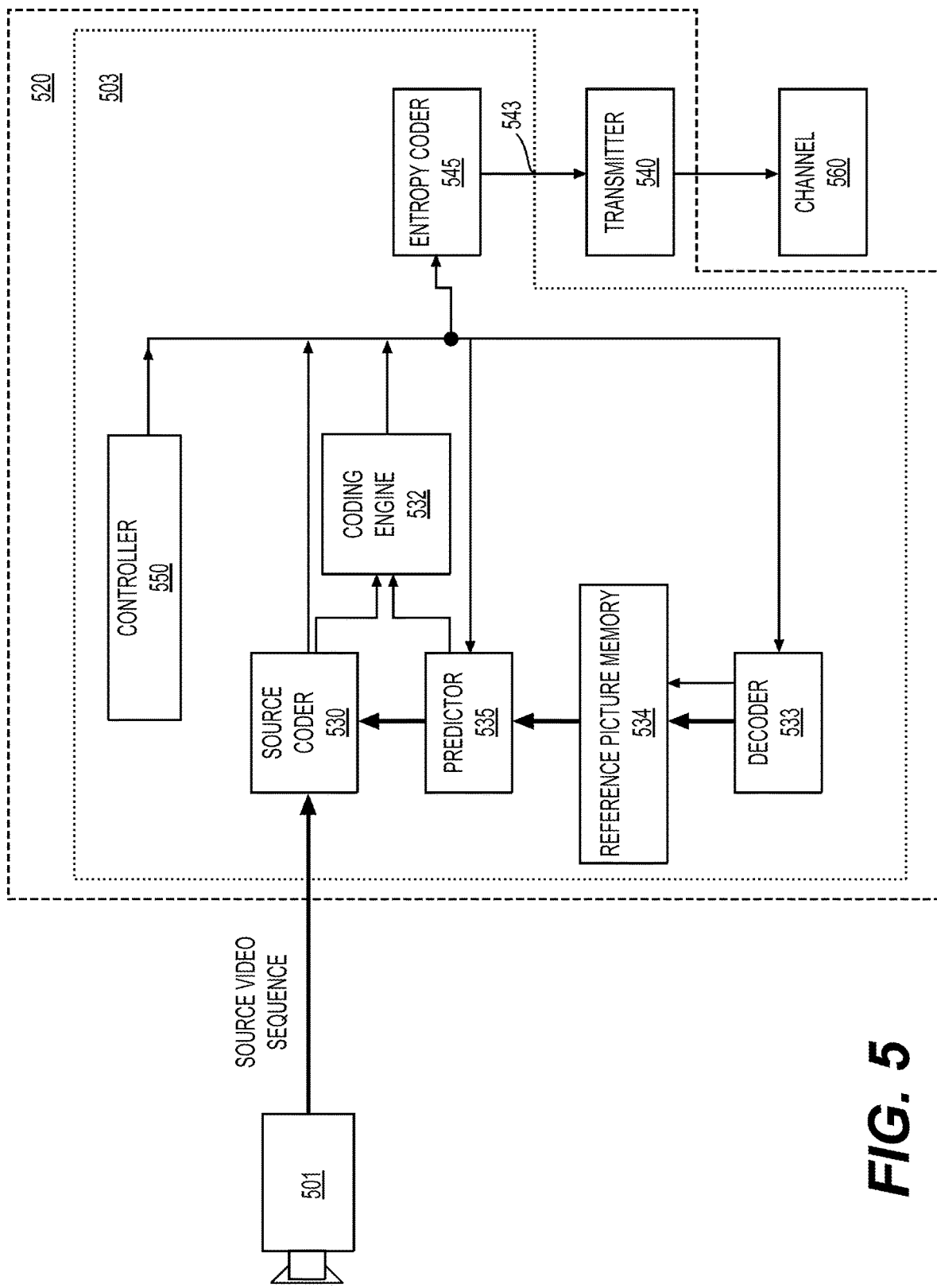
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. Ina videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
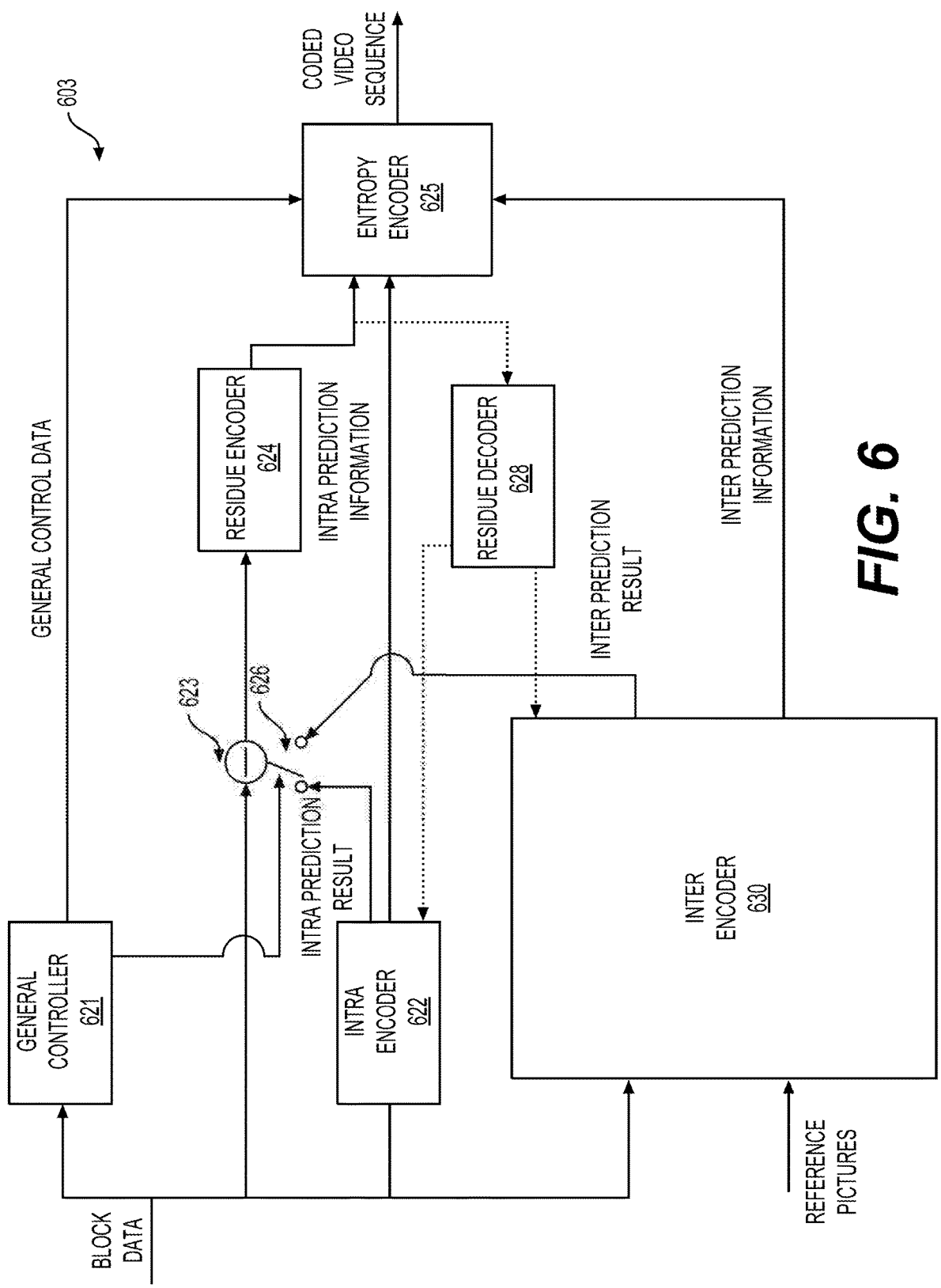
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
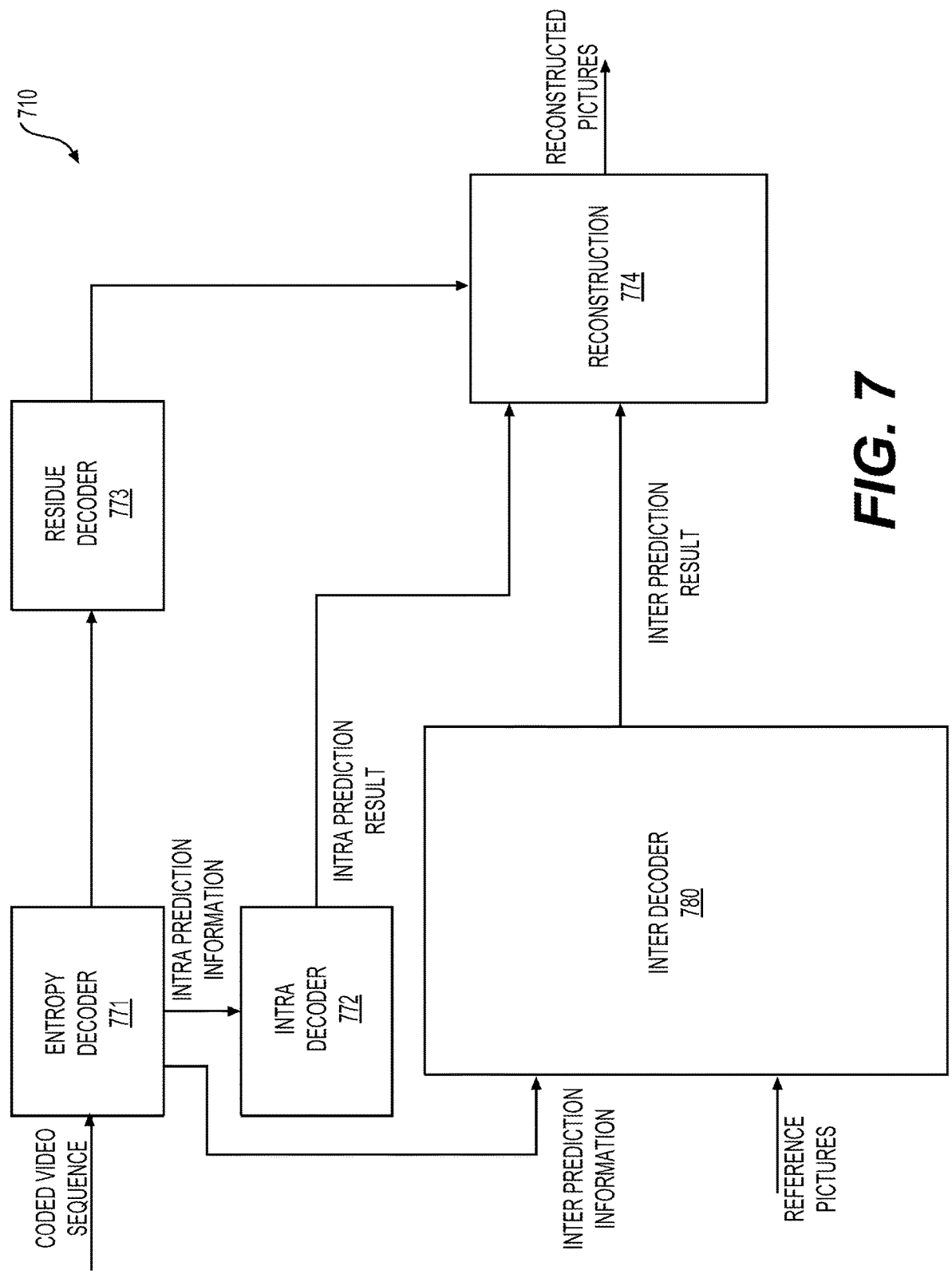
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771)(data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303). (503), and (503), and the video decoders (310), (410), and (710) can be implemented using one or more processors that execute software instructions.

II. Coding Modes of Joined Cb and Cr Residual (JCCR), Intra Block Copy (IBC), and Combined intra and Inter Prediction (CIIP)

1. Joined Coding of Chroma Residuals

VVC Draft 6 (JVET-O2001-vE) supports a mode where the chroma residuals of Cb and Cr components are coded jointly. The usage (activation) of a joint Cb and Cr residual (JCCR) coding mode is indicated by a TU-level flag tu_joint_cbcr_residual_flag and a selected mode is implicitly indicated by chroma coded block flags (CBFs). The flag tu_joint_cbcr_residual_flag is present if either or both the chroma CBFs for a TU are equal to 1. In a picture parameter set (PPS) and/or a slice header, JCCR chroma quantization parameter (QP) offset values are signaled for the joint chroma residual coding mode to differentiate from the chroma QP offset values signaled for regular chroma residual coding mode. These JCCR chroma QP offset values are used to derive chroma QP values for those blocks coded using the joint chroma residual coding mode.

Table 1 shows an example of construction of chroma residuals for three different joint chroma coding modes (or JCCR modes): Mode 1, Mode 2, and mode 3. When Mode 2 is active in a TU, the respective JCCR chroma QP offset is added to the applied luma-derived chroma QP during quantization and decoding of that TU. For the other modes (Mode 1 and Mode 3 in Table 1), the JCCR chroma QPs are derived in the same way as for conventional Cb or Cr blocks. A reconstruction process of chroma residuals (denoted resCb and resCr) from transmitted transform blocks is depicted in Table 1. When the JCCR coding mode is activated, one single joint chroma residual block (denoted resJointC[x][y]) is signaled. A residual block for a Cb component (resCb) and a residual block for a Cr component (resCr) are derived considering information such as CBFs (denoted tu_cf_cb, and tu_cbf_cr), and a CSign. The value CSign is a sign value (+1 or −1), and specified in the slice header.

TABLE 1

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

In an example, Modes 1, 2, and 3 are supported in intra coded CUs, while for in inter-coded CUs, only mode 2 is supported. Hence, in an example, for inter coded CUs, the syntax element tu_joint_cbcr_residual_flag is only present if both chroma CBFs are 1 (Mode 2 situation).

Related specification texts of the JCCR coding mode as described in the VVC draft version 6 are described below.

An example of syntax of a transform unit is shown in Table 2 and Table 3 from row 1 to row 51. At rows 32-33, when the JCCR coding mode is enabled at an SPS level, and when the transform unit is coded in an intra prediction mode and one of the two CBFs is of a value of one, or when both of the two CBFs are of a value of one, a tu_joint_cbcr_residual_flag is signaled.

TABLE 2

| | | Descriptor |
|---|---|---|
| 1 | transform_unit( x0, y0, tbWidth, tbHeight, treeType, subTuIndex ) { | |
| 2 |   if( ( treeType = = SINGLE_TREE \|\| treeType = = DUAL_TREE_CHROMA ) && ChromaArrayTyper != 0 ) { | |
| 3 |     if( ( IntraSubPartitionsSplitType = = ISP_NO_SPLIT && !( cu_sbt_flag && <br>      ( ( subTuIndex = = 0 && cu_sbt_pos_flag ) \|\| <br>        ( subTuIndex = = 1 && !cu_sbt_pos_flag ) ) ) ) \|\| <br>      ( IntaSubPartitionsSplitType != ISP_NO_SPLIT && <br>      ( subTuIndex = = NumIntraSubPatitions - 1 ) ) ) { | |
| 4 |       tu_cbf_cb[ x0 ][ y0 ] | ae(v) |
| 5 |       tu_cbf_cr[ x0 ][ y0 ] | ae(v) |
| 6 |     } | |
| 7 |   } | |
| 8 |   if( treeType = = SINGLE_TREE \|\| treeType = = DUAL_TREE_LUMA ) { | |
| 9 |     if( ( IntraSubPartitionsSplitType = = ISP_NO_SPLIT && !( cu_sbt_flag && <br>      ( ( subTuIndex = = 0 && cu_sbt_pos_flag ) \|\| <br>        ( subTuIndex = = 1 && !cu_sbt_pos_flag ) ) ) && <br>      ( CuPredMode[ x0 ][ y0 ] = = MODE_INTRA \|\| <br>        tu_cbf_cb[ x0 ][ y0 ] \|\| tu_cbf_cr[ x0 ][ y0 ] \|\| <br>        CbWidth[ x0 ][ y0 ] > MaxTbSizeY \|\| CbHeight[ x0 ][ y0 ] > MaxTbSizeY ) ) \|\| <br>      ( IntraSubPartitionsSplitType != ISP_NO_SPLIT && <br>      ( subTuIndex < NumIntraSubPartitions - 1 \|\| !InferTuCbfLuma ) ) ) | |
| 10 |     tu_cbf_luma[ x0 ][ y0 ] | ae(v) |
| 11 |     if (IntraSubPartitionsSplitType != ISP_NO_SPLIT ) | |
| 12 |       InferTuCbfLuma = InferTuCbfLuma && !tu_cbf_luma[ x0 ][ y0 ] | |
| 13 |   } | |
| 14 |   if( IntraSubPartitionsSplitType != ISP_NO_SPLIT && <br>    treeType = = SINGLE_TREE && subTuIndex = = NumIntraSubPartitions - 1 ) ) | |
| 15 |     xC = CbPosX[ x0 ][ y0 ] | |
| 16 |     yC = CbPosY[ x0 ][ y0 ] | |
| 17 |     wC = CbWidth[ x0 ][ y0 ] / SubWidthC | |
| 18 |     hC = CbHeight[ x0 ][ y0 ] / SubHeightC | |
| 19 |   } else | |
| 20 |     xC = x0 | |
| 21 |     yC = y0 | |
| 22 |     wC = tbWidth / SubWidthC | |
| 23 |     hC = tbHeight / SubHeightC | |
| 24 |   } | |

TABLE 3

| | | |
|---|---|---|
| 25 | if( ( tu_cbf_luma[ x0 ][ y0 ] \|\| tu_cbf_cb[ x0 ][ y0 ] \|\| tu_cbf_cr[ x0 ][ y0 ] ) && <br>  treeType != DUAL_TREE_CHROMA ) { | |
| 26 |   if( cu_qp_delta_enabled_flag && !IsCUQpDeltaCoded ) { | |
| 27 |     cu_qp_delta_abs | ae(v) |
| 28 |     if( cu_qp_delta_abs ) | |
| 29 |       cu_qp_delta_sign_flag | ae(v) |
| 30 |   } | |
| 31 | } | |
| 32 | if( sps_joint_cbcr_enabled_flag && ( ( CuPredMode[ x0 ][ y0 ] = = MODE_INTRA && <br>  ( tu_cbf_cb[ x0 ][ y0 ] \|\| tu_cbf_cr[ x0 ][ y0 ] ) ) \|\| <br>  ( tu_cbf_cb[ x0 ][ y0 ] && tu_cbf_cr[ x0 ][ y0 ] ) ) ) | |

TABLE 3-continued

```
33          tu_joint_cbcr_residual_flag[ x0 ][ y0 ]                                            ae(v)
34          if( tu_cbf_luma[ x0 ][ y0 ] && treeType != DUAL_TREE_CHROMA
               && ( tbWidth <= 32 ) && ( TbHeight <= 32 )
               && ( IntraSubPartitionsSplit[ x0 ][ y0 ] = = ISP_NO_SPLIT ) && ( !cu_sbt_flag ) ) {
35             if( sps_transform_skip_enabled_flag && !BdpcmFlag[ x0 ][ y0 ] &&
                  tbWidth <= MaxTsSize && tbHeight <= MaxTsSize )
36                transform_skip_flag[ x0 ][ y0 ]                                              ae(v)
37             if( (( CuPredMode[ x0 ][ y0 ] = = MODE_INTER &&
   sps_explict_mts_inter_enabled_flag )
                  | | ( CuPredMode[ x0 ][ y0 ] = = MODE_INTRA &&
   sps_explict_mts_intra_enabled_flag ))
                  && ( !transform_skip_flag[ x0 ][ y0 ] ) )
38                tu_mts_idx[ x0 ][ y0 ]                                                       ae(v)
39          }
40          if( tu_cbf_luma[ x0 ][ y0 ] ) {
41             if( !transform_skip_flag[ x0 ][ y0 ] )
42                residual_coding( x0, y0, Log2( tbWidth ), Log2( tbHeight ), 0 )
43             else
44                residual_ts_coding( x0, y0, Log2( tbWidth ), Log2( tbHeight ), 0 )
45          }
46          if( tu_cbf_cb[ x0 ][ y0 ] )
47             residual_coding( xC, yC, Log2( wC ), Log2( hC ), 1 )
48          if( tu_cbf_cr[ x0 ][ y0 ] &&
               !( tu_cbf_cb[ x0 ][ y0 ] && tu_joint_cbcr_residual_flag[ x0 ][ y0 ] )) {
49             residual_coding( xC, yC, Log2( wC ), Log2( hC ), 2 )
50          }
51    }
```

Corresponding to the above transform unit syntax, transform unit semantics are defined as follows.

The syntax element tu_cbf_cb[x0][y0] equal to 1 specifies that the Cb transform block contains one or more transform coefficient levels not equal to 0. The array indices x0,y0 specify the top-left location (x0, y0) of the considered transform block. When tu_cbf_cb[x0][y0] is not present in the current TU, its value is inferred to be equal to 0.

The syntax element tu_cbf_cr[x0][y0] equal to 1 specifies that the Cr transform block contains one or more transform coefficient levels not equal to 0. The array indices x0, y0 specify the top-left location (x0, y0) of the considered transform block. When tu_cbf_cr[x0][y0] is not present in the current TU, its value is inferred to be equal to 0.

The syntax element tu_joint_cbcr_residual_flag[x0][y0] specifies whether the residual samples for both chroma components Cb and Cr are coded as a single transform block. The array indices x0, y0 specify the location (x0, y0) of the top-left luma sample of the considered transform block relative to the top-left luma sample of the picture.

The syntax element tu_joint_cbcr_residual_flag[x0][y0] equal to 1 specifies that the transform unit syntax includes the transform coefficient levels for a single transform block from which the residual samples for both Cb and Cr are derived. The syntax element tu_joint_cbcr_residual_flag [x0][y0] equal to 0 specifies that the transform coefficient levels of the chroma components are coded as indicated by the syntax elements tu_cbf_cb[x0][y0] and tu_cbf_cr[x0][y0]. When tu_joint_cbcr_residual_flag[x0][y0] is not present, it is inferred to be equal to 0.

Depending on tu_joint_cbcr_residual_flag[x0][y0], tu_cbf_cb[x0][y0], and tu_cbf_cr[x0][y0], the variable TuCResMode[x0][y0] can be derived as follows: If tu_joint_cbcr_residual_flag[x0][y0] is equal to 0, the variable TuCResMode[x0][y0] is set equal to 0; Otherwise, if tu_cbf_cb[x0][y0] is equal to 1 and tu_cbf_cr[x0][y0] is equal to 0, the variable TuCResMode[x0][y0] is set equal to 1; Otherwise, if tu_cbf_cb[x0][y0] is equal to 1, the variable TuCResMode[x0][y0] is set equal to 2; Otherwise, the variable TuCResMode[x0][y0] is set equal to 3.

An example of a scaling and transform process is described below. Inputs to this process are: a luma location (xTbY, yTbY) specifying the top-left sample of the current luma transform block relative to the top-left luma sample of the current picture, a variable cIdx specifying the colour component of the current block, a variable nTbW specifying the transform block width, a variable nTbH specifying the transform block height. Output of this process is the (nTbW)×(nTbH) array of residual samples resSamples[x][y] with x=0 . . . nTbW−1, y=0 . . . nTbH−1.

The variables bitDepth, bdShift and tsShift are derived as follows:

$$bitDepth=(cIdx==0)?BitDepth_Y:BitDepth_C,$$

$$bdShift=\text{Max}(22-bitDepth,0),$$

$$tsShift=5+((\text{Log }2(nTbW)+\text{Log }2(nTbH))/2).$$

The variable codedCIdx is derived as follows: If cIdx is equal to 0 or TuCResMode[xTbY][yTbY] is equal to 0, codedCIdx is set equal to cIdx. Otherwise, if TuCResMode [xTbY][yTbY] is equal to 1 or 2, codedCIdx is set equal to 1. Otherwise, codedCIdx is set equal to 2.

The variable cSign is set equal to (1-2*slice_joint_cbcr_sign_flag).

The (nTbW)×(nTbH) array of residual samples resSamples is derived in the following four steps.

At step 1, the scaling process for transform coefficients is invoked with the transform block location (xTbY, yTbY), the transform width nTbW and the transform height nTbH, the colour component variable cIdx and the bit depth of the current colour component bitDepth as inputs, and the output is an (nTbW)×(nTbH) array of scaled transform coefficients d.

At step 2, the (nTbW)×(nTbH) array of residual samples r is derived as follows: If transform_skip_flag[xTbY] [yTbY][cIdx] is equal to 1, the residual sample array values r[x][y] with with x=0 . . . nTbW−1, y=0 . . . nTbH−1 are derived as follows:

$$r[x][y]=d[x][y]<<tsShift.$$

Otherwise (transform_skip_flag[xTbY][yTbY][cIdx] is equal to 0), the transformation process for scaled transform coefficients is invoked with the transform block location (xTbY, yTbY), the transform width nTbW and the transform height nTbH, the colour component variable cIdx and the (nTbW)×(nTbH) array of scaled transform coefficients d as inputs, and the output is an (nTbW)×(nTbH) array of residual samples r.

At step 3, the residual samples resSamples[x][y] with x=0 . . . nTbW−1, y=0 . . . nTbH−1 are derived as follows:

resSamples[x][y]=(r[x][y]+(1<<(bdShift−1)))>>bdShift.

At step 4, the residual samples resSamples[x][y] with x=0 . . . nTbW−1, y=0 . . . nTbH−1 are derived as follows: If cdx is equal to codedCIdx, the following applies:

resSamples[x][y]=res[x][y].

Otherwise, if TuCResMode[xTbY][yTbY] is equal to 2, the following applies:

resSamples[x][y]=c Sign*res[x][y].

Otherwise, the following applies:

resSamples[x][y]=(c Sign*res[x][y])>>1.

An example of a binarization process is described below. Input to this process is a request for a syntax element. Output of this process is the binarization of the syntax element.

Table 4 specifies the type of binarization process associated with each syntax element and corresponding inputs. As shown, the truncated Rice (TR) binarization process and the fixed-length (FL) binarization process can be employed.

TABLE 4

| Syntax structure | Syntax element | Process | Input parameters |
|---|---|---|---|
| transform_unit( ) | tu_cbf_luma[ ][ ][ ] | FL | cMax = 1 |
|  | tu_cbf_cb[ ][ ][ ] | FL | cMax = 1 |
|  | tu_cbf_cr[ ][ ][ ] | FL | cMax = 1 |
|  | cu_qp_delta_abs |  | — |
|  | cu_qp_delta_sign_flag | FL | cMax = 1 |
|  | cu_chroma_qp_offset_flag | FL | cMax = 1 |
|  | cu_chroma_qp_offset_idx | TR | cMax = chroma_qp_offset_list_len_minus1, cRiceParam = 0 |
|  | transform_skip_flag[ ][ ] | FL | cMax = 1 |
|  | tu_mts_idx[ ][ ] | TR | cMax = 4, cRiceParam = 0 |
|  | tu_joint_cbcr_residual_flag[ ][ ] | FL | cMax = 1 |

In a derivation process, variables of ctxTable, ctxIdx and bypassFlag can be determined. For example, based on the position of the current bin within the bin string, binIdx, ctxTable, ctxIdx and bypassFlag can be output from the derivation process. Table 5 shows examples of syntax elements and bypassFlag or ctxIdx corresponding to each bin of the respective syntax elements. For example, as shown at the bottom of Table 5, the syntax element tu_joint_cbcr_residual_flag can include one bin. A context model index (ctxIdx) can be determined according to:

2*tu_cbf_cb[ ][ ]+tu_cbf_cr[ ][ ]−1.

As the CBF syntax elements tu_cbf_cb or tu_cbf_cr can each have a value of 1 or 0, the context model index can be one of the following three values: 0, 1, or 2, which correspond to three context models. It is noted that when both tu_cbf_cb and tu_cbf_cr are of zero values, the syntax element tu_joint_cbcr_residual_flag is not signalled.

TABLE 5

| Syntax element | binIdx 0 | 1 | 2 | 3 | 4 | >=5 |
|---|---|---|---|---|---|---|
| bcw_idx[ ][ ] NoBackwardPredFlag == 1 | 0 | bypass | bypass | bypass | na | na |
| cu_cbf | 0 | na | na | na | na | na |
| cu_sbt_flag | ( cbWidth * cbHeight < 256 ) ? 1 : 0 | na | na | na | na | na |
| cu_sht_quad_flag | 0 | na | na | na | na | na |
| cu_sbt_horizontal_flag | ( cbWidth == cbHeight ) ? 0 : ( cbWidth < cbHeight ) ? 1 : 2 | na | na | na | na | na |
| cu_sbt_pos_flag | 0 | na | na | na | na | na |
| lfnst_idx[ ][ ] | ( tu_mts_idx[ x0 ][ y0 ] == 0 && treeType != SINGLE_TREE ) ? 1 : 0 | bypass | na | na | na | na |

TABLE 5-continued

| Syntax element | binIdx | | | | | |
| --- | --- | --- | --- | --- | --- | --- |
| | 0 | 1 | 2 | 3 | 4 | >=5 |
| abs_mvd_greater0_flag[ ] | 0 | na | na | na | na | na |
| abs_mvd_greater1_flag[ ] | 0 | na | na | na | na | na |
| abs_mvd_minus2[ ] | bypass | bypass | bypass | bypass | bypass | bypass |
| mvd_sign_flag[ ] | bypass | na | na | na | na | na |
| tu_cbf_luma[ ][ ][ ] | 0, 1, 2, 3 (clause 9.3.4.2.5) | na | na | na | na | na |
| tu_cbf_cb[ ][ ][ ] | 0 | na | na | na | na | na |
| tu_cbf_cr[ ][ ][ ] | tu_cbf_cb[ ][ ][ ] | na | na | na | na | na |
| cu_qp_delta_abs | 0 | 1 | 1 | 1 | 1 | bypass |
| cu_qp_delta_sign_flag | bypass | na | na | na | na | na |
| cu_chroma_qp_offset_flag | 0 | na | na | na | na | na |
| cu_chroma_qp_offset_idx | 0 | 0 | 0 | 0 | 0 | na |
| transform_skip_flag[ ][ ] | 0 | na | na | na | na | na |
| tu_mts_idx[ ][ ] | 0 | 1 | 2 | 3 | na | na |
| tu_joint_cber_residual_flag[ ][ ] | 2*tu_cbf_cbf[ ][ ] + tu_cbf_cr[ ][ ] − 1 | na | na | na | na | na |

2. Intra Block Copy Mode

For hybrid block based video coding, motion compensation from a different picture (inter picture motion compensating) is well known. Similarly, motion compensation can also be performed from a previously reconstructed area within the same picture. This is referred to as intra picture block compensation, current picture referencing (CPR), or intra block copy (IBC. In IBC, a displacement vector that indicates an offset between a current block and a reference block is referred to as a block vector (BV). Different from a motion vector in motion compensation from a different picture, which can beat any value (positive or negative, at either x or y direction), a block vector has a few constraints such that it is ensured that the pointed reference block is available and already reconstructed. Also, for parallel processing consideration, some reference area that is a tile boundary or a wavefront ladder shape boundary is also excluded for IBC.

The coding of a block vector can be either explicit or implicit. In the explicit mode (or referred to as advanced motion vector prediction (AMVP) mode in inter coding), the difference between a block vector and its predictor is signaled; in the implicit mode, the block vector is recovered purely from its predictor, in a similar way as a motion vector obtained in merge mode. The resolution of a block vector, in some implementations, is restricted to integer positions; in other systems, it may be allowed to point to fractional positions.

In an embodiment, the use of IBC at block level can be signaled using a block level flag, referred to as an IBC flag. In an example, the IBC flag is signaled when the current block is not coded in merge mode. In another example, the use of IBC can be signaled by a reference index approach, and the current decoded picture is treated as a reference picture. For example, in HEVC Screen Content Coding (SCC), such a reference picture is put in the last position of a reference picture list. This special reference picture is also managed together with other temporal reference pictures in a decoded picture buffer (DPB).

There are also some variations for intra block copy, such as flipped intra block copy (the reference block is flipped horizontally or vertically before used to predict current block), or line based intra block copy (each compensation unit inside an M×N coding block is an M×1 or 1×N line).

Figure 8:
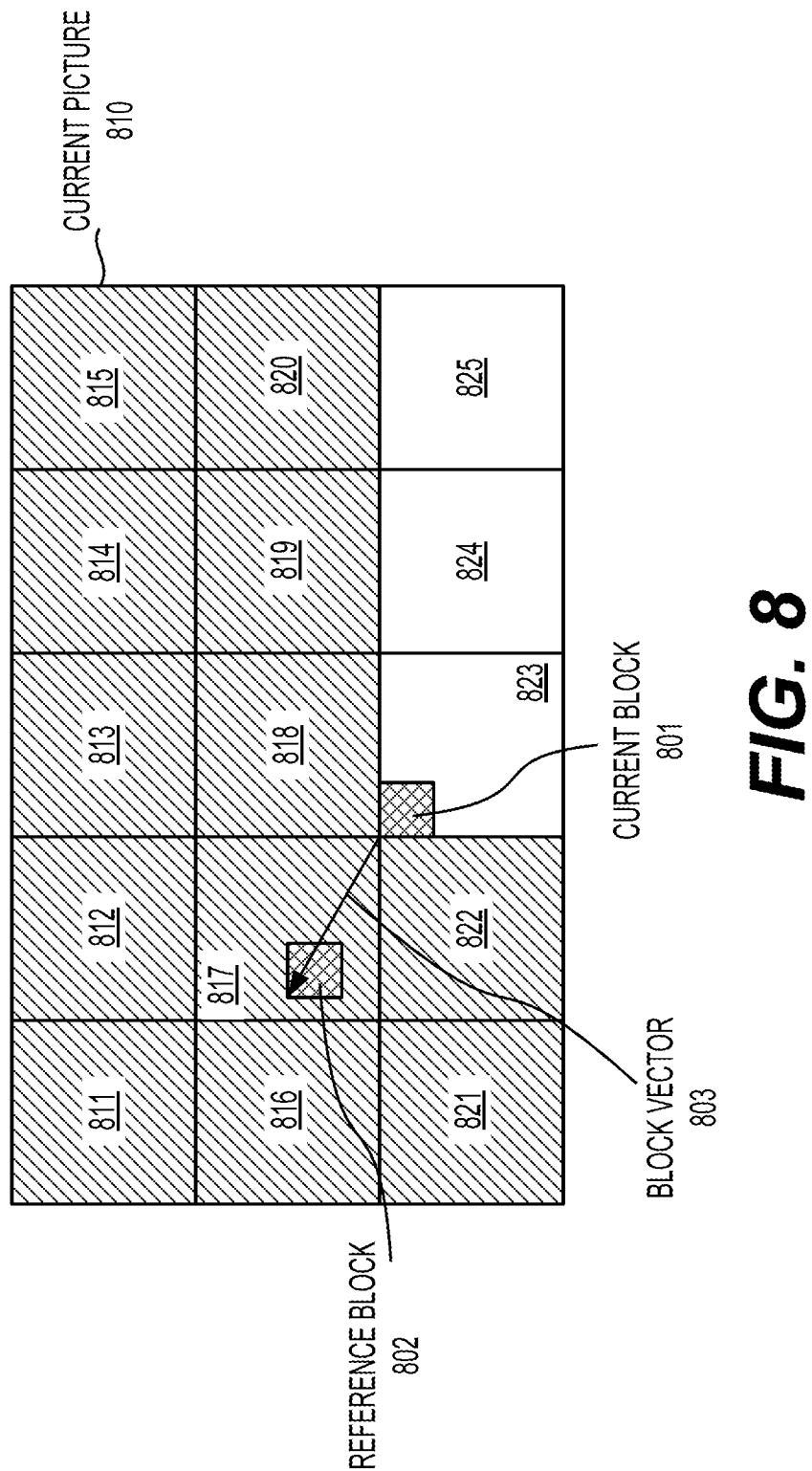
FIG. 8 shows an example of intra picture block compensation.

FIG. 8 shows an example of intra picture block compensation. A picture (810) under processing (referred to as a current picture) is partitioned into CTUs (811-825). The CTUs (811-822) have been decoded. The current CTU (823) is under processing. To decode a IBC-coded current block (801) in the current CTU (823), a block vector (803) can first be determined. Based on the block vector (803), a reference block (802) (also referred to as a prediction block or a predictor block) in the CTU (817) can be located. Accordingly, the current block (801) can be reconstructed by combining the reference block (802) with a residual of the current block (801). As shown, the reference block (802) and the current block (801) reside in the same current picture (810).

3. Combined Intra and Inter Prediction

Figure 9:
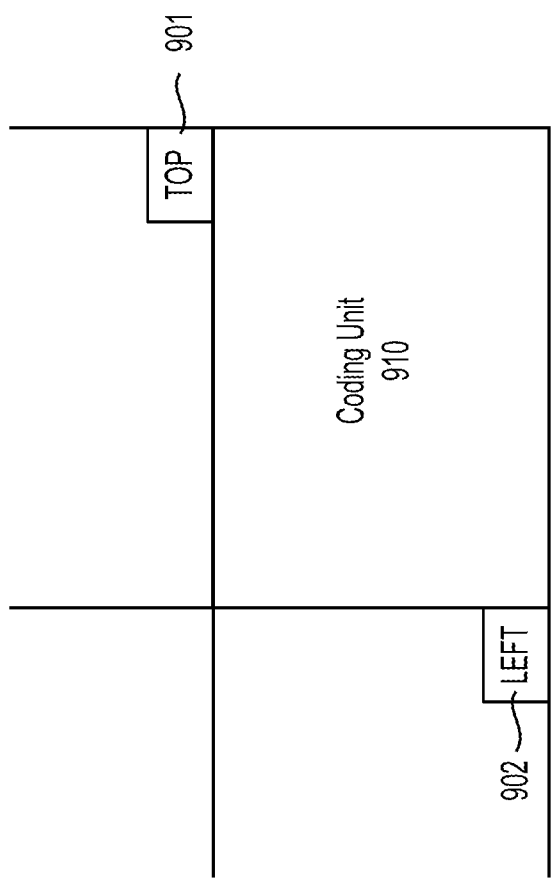
FIG. 9 shows a coding unit (CU)(910).

FIG. 9 shows a CU (910), In an embodiment, when the CU is coded in merge mode, if the CU (910) contains at least 64 luma samples (e.g., a CU width times a CU height is equal to or larger than 64), and if both the CU width and the CU height are less than 128 luma samples, an additional flag is signalled to indicate if a combined inter/intra prediction (CIP) mode is applied to the current CU (910). As its name indicates, the CIIP prediction combines an inter prediction signal with an intra prediction signal. The inter prediction signal in the CIP mode $P_{inter}$ is derived using the same inter prediction process applied to regular merge mode. The intra prediction signal $P_{intra}$ is derived following the regular intra prediction process with the planar mode. Then, the intra and inter prediction signals are combined using weighted averaging. The weight value is calculated depending on the coding modes of a top and left neighboring blocks (901 and 902) of the CU (910).

For example, the weight value can be calculated as follows. If the top neighbor is available and intra coded, then set isIntraTop to 1, otherwise set isIntraTop to 0. If the left neighbor is available and intra coded, then set isIntraLeft to 1, otherwise set isIntraLeft to 0. If (isIntraLeft+isIntraLeft) is equal to 2, then the weight value (denoted wt) is set to 3. Otherwise, if (isIntraLeft+isIntraLeft) is equal to 1, then wt is set to 2. Otherwise, set wt to 1.

In an example, the CIP prediction can be formed as follows:

$$P_{CIIP}=((4-wt)*P_{inter}+*wt*P_{intra}+2)>>2.$$

III. Improvement for Joint Chroma Residue Coding

In some embodiments, the three JCCR modes (Modes 1-3) as defined in Table 1 are applied to both inter coded CUs and intra coded CUs. Specifically, each of the Modes 1-3 can be applied to inter coded CUs, and each of the Modes 1-3 can be applied to inter coded CUs.

For example, for an inter coded CU, when the tu_cbf_cb and tu_cbf_cr of the CU have values of 1 and 0 respectively (Mode 1 situation), or values of 0 and 1 respectively (Mode 3 situation), JCCR processing can still be applied to the inter coded CU. For example, corresponding to rows 32-33 of the transform unit syntax in Table 3, to apply Mode 1 and Mode 3 to the inter coded CU, the syntax in row 32 can be revised to allow signaling of the TU level JCCR activation flag, tu_joint_cbcr_residual_flag, when one of the t_cbf_cb and tu_cbf_cr has a zero value.

In some embodiments, the JCCR mode can be applied to a CU coded in IBC mode, or a CU coded in CIP mode. An JCCR activation flag can be signaled for the IBC coded CU or the CIP coded CU. In some embodiments, for entropy coding of the CU coded in IBC mode or CUP mode, the IBC mode and the CIP mode can be treated as an intra prediction mode for selecting a context model.

In an embodiment, for entropy coding (encoding or decoding) a TU level JCCR activation flag, tu_joint_cbcr_residual_flag, of a current block (or current CU), a context model can be selected from a set of candidate context models each associated with a context index (denoted ctxIdx). The selection can depend on previously coded (encoded or decoded) information of the current block. The previously coded information can include a prediction mode of the current block, and CBFs of the current block.

The prediction mode of the current block can include an inter prediction mode and an intra prediction mode. When the current block is coded with a IBC mode or a CIP mode, the current block is treated as being coded with an intra prediction mode. The prediction mode of the current block can be determined according to a syntax element previously parsed from a bitstream. Or, when the syntax element is not available (not present in the bitstream), a value of the respective syntax element can be inferred.

In an example, during a decoding process of processing the current block, a prediction mode of the current block can be determined. For example, a syntax element (e.g., a prediction mode flag, denoted pred_mode_flag) indicating whether the current block (or CU) is coded with an inter prediction mode or an intra prediction mode can be received and parsed from a bitstream. For example, pred_mode_flag equal to 0 specifies that the current coding unit is coded in inter prediction mode, while pred_mode_flag equal to 1 specifies that the current coding unit is coded in intra prediction mode.

Or, when the syntax element indicating the prediction mode is not signaled, a value of the syntax element can be inferred. In an example, when pred_mode_flag is not present, it is inferred as follows. If a width of the current block (denoted cbWidth) is equal to 4 and a height of the current block (cbHeight) is equal to 4, pred_mode_flag is inferred to be equal to 1, Otherwise, if modeType is equal to MODE_TYPE_INTRA, pred_mode_flag is inferred to be equal to 1. Otherwise, if modeType is equal to MODE_TYPE_INTER, pred_mode_flag is inferred to be equal to 0. Otherwise, pred_mode_flag is inferred to be equal to 1 when decoding an I slice, and equal to 0 when decoding a P or B slice, respectively.

In an example, the current block is coded with the ICP mode. Accordingly, an syntax element, denoted pre_mode_ibc_flag, can be received or parsed from the bitstream. pred_mode_ibc_flag equal to 1 specifies that the current coding unit is coded in IBC prediction mode. pred_mode_ibc_flag equal to 0 specifies that the current coding unit is not coded in IBC prediction mode. Similarly, when pred_mode_ibc_flag is not present, the pred_mode_ibc_flag can be inferred.

In an example, the current block is coded with the CIP mode. Accordingly, an syntax element, denoted ciip_flag, can be received or parsed from the bitstream. ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture. When ciip_flag[x0][y0] is not present, the ciip_flag can be inferred.

In addition, CBFs of the current block can be determined or inferred. For example, a first TU CBF of a Cb transform block of the current block, denoted tu_cbf_cb, can be received and parsed from the bitstream. The Cb CBF can indicate whether the Cb transform block contains one or more transform coefficient levels not equal to zero. In an example, tu_cbf_cb[x0][y0] equal to 1 specifies that the Cb transform block contains one or more transform coefficient levels not equal to 0. The array indices x0, y0 specify the top-left location (x0, y0) of the considered transform block. When tu_cbf_cb[x0][y0] is not present in the current TU, a value of the Cb CBF is inferred to be equal to 0.

Similarly, a second TU coded block flag of a Cr transform block of the current block, denoted tu_cbf_cr, can be received and parsed from the bitstream. The Cr CBF can indicate whether the Cr transform block contains one or more transform coefficient levels not equal to 0. In an example, tu_cbf_cr[x0][y0] equal to 1 specifies that the Cr transform block contains one or more transform coefficient levels not equal to 0. The array indices x0, y0 specify the top-left location (x0, y0) of the considered transform block. When tu_cbf_cr[x0][y0] is not present in the current TU, a value of the Cr CBF is inferred to be equal to 0.

In an embodiment, for entropy coding (encoding or decoding) the tu_joint_cbcr_residual_flag, of the current block (or current CU), the context model can be determined based on the prediction mode of the current block, and the CBFs of the current block.

In a first example, the context index of tu_joint_cbcr_residual_flag, denoted contextIdx (or ctxIdx), can be calculated by the following expression:

$$contextIdx = (2*tu\_cbf\_cb + tu\_cbf\_cr - 1) + 3*(isIntra?0:1).$$

The variable isIntra equals 1 when the current block is coded with an intra prediction mode, or 0 when the current block is coded with an inter prediction mode. Corresponding to different combinations of different values of the CBFs and the prediction modes, there can be 6 context indices (from 0 to 5) corresponding to 6 candidate context models. In the present disclosure, contextIdx and ctxIdx are used interchangeably to refer to a context index.

In a second example, the context index of tu_joint_cbcr_residual_flag can be calculated by the following expressions:

$$cbfCbCr = 2*tu\_cbf\_cb + tu\_cbf\_cr$$

$$contextIdx = (cbfCbCr == 3)?0:(cbfCbCr + 2*(isIntra?0:1)).$$

Corresponding to different combinations of different values of the CBFs and the prediction modes, there can be 5 context indices (from 0 to 4) corresponding to 5 candidate context models.

In a third example, the context index of tu_joint_cbcr_residual_flag can be calculated by the following expressions:

cbfCbCr=2*tu_cbf_cb+tu_cbf_cr, contextIdx=(cbfCbCr==3)?0:((isIntra?cbfCbCr: 3)).

Corresponding to different combinations of different values of the CBFs and the prediction modes, there can be 4 context indices (from 0 to 3) corresponding to 4 candidate context models.

In a fourth example, the context index of tu_joint_cbcr_residual_flag can be calculated by the following expressions:

cbfCbCr=2*tu_cbf_cb+tu_cbf_cr contextIdx=(cbfCbCr==3)?0:(isIntra?1:2)).

Corresponding to different combinations of different values of the CBFs and the prediction modes, there can be 3 context indices (from 0 to 2) corresponding to 3 candidate context models.

In some embodiments, for entropy coding (encoding or decoding) the tu_joint_cbcr_residual_flag, of the current block (or current CU), the context model can be determined based on coded information of neighboring blocks of the current block. For example, the coded information of the neighboring blocks can include prediction modes and CBFs of the neighboring blocks.

In some embodiments, for entropy coding (encoding or decoding) the tu_joint_cbcr_residual_flag, of the current block (or current CU), the context model can be determined based on coded information of the current block and/or the neighboring blocks of the current block.

In an embodiments, for entropy coding (encoding or decoding) a TU level JCCR activation flag, tu_joint_cbcr_residual_flag, of a current block (or current CU), a context model can be selected from a set of candidate context models each corresponding to a context index (denoted ctxIdx). The selection can depend on a block size of the current block. For example, the block size can be indicated by a block width, a block height, a block area size, a sum of the block width and height, a maximum of the block width and height, a minimum of the block width and height, and the like.

For example, applying the JCCR mode to different blocks with different block sizes can lead to different coding efficiency and computation cost. Accordingly, blocks with different sizes may have different probabilities of activation of the JCCR mode. By determining the context model based on the block size can improve the entropy coding efficiency of the TU level JCCR activation flag.

In an example, a threshold K of a block size is employed for determination of a context index. For example, when the block size of the current block is smaller than the threshold K, a first context is used. Otherwise, a second context is used.

In an embodiment, selection of a context model for entropy coding of a current block can depend on a size of the current block as well as previously coded (encoded or decoded) information of the current block. The previously coded information can include a prediction mode of the current block, and CBFs of the current block.

In an example, a context index of a tu_joint_cbcr_residual_flag of the current block can be calculated by the following expression:

(2*tu_cbf_cb+tu_cbf_cr-1)+3*(blockSize<K?0:1).

K represents a threshold, and can be a positive integer, such as 128 or 256. Accordingly, there can be 6 candidate context models: 3 candidates when the block size is smaller than K, and 3 other candidates when the block size is greater than or equal to K.

IV. Example Coding Process

Figure 10:
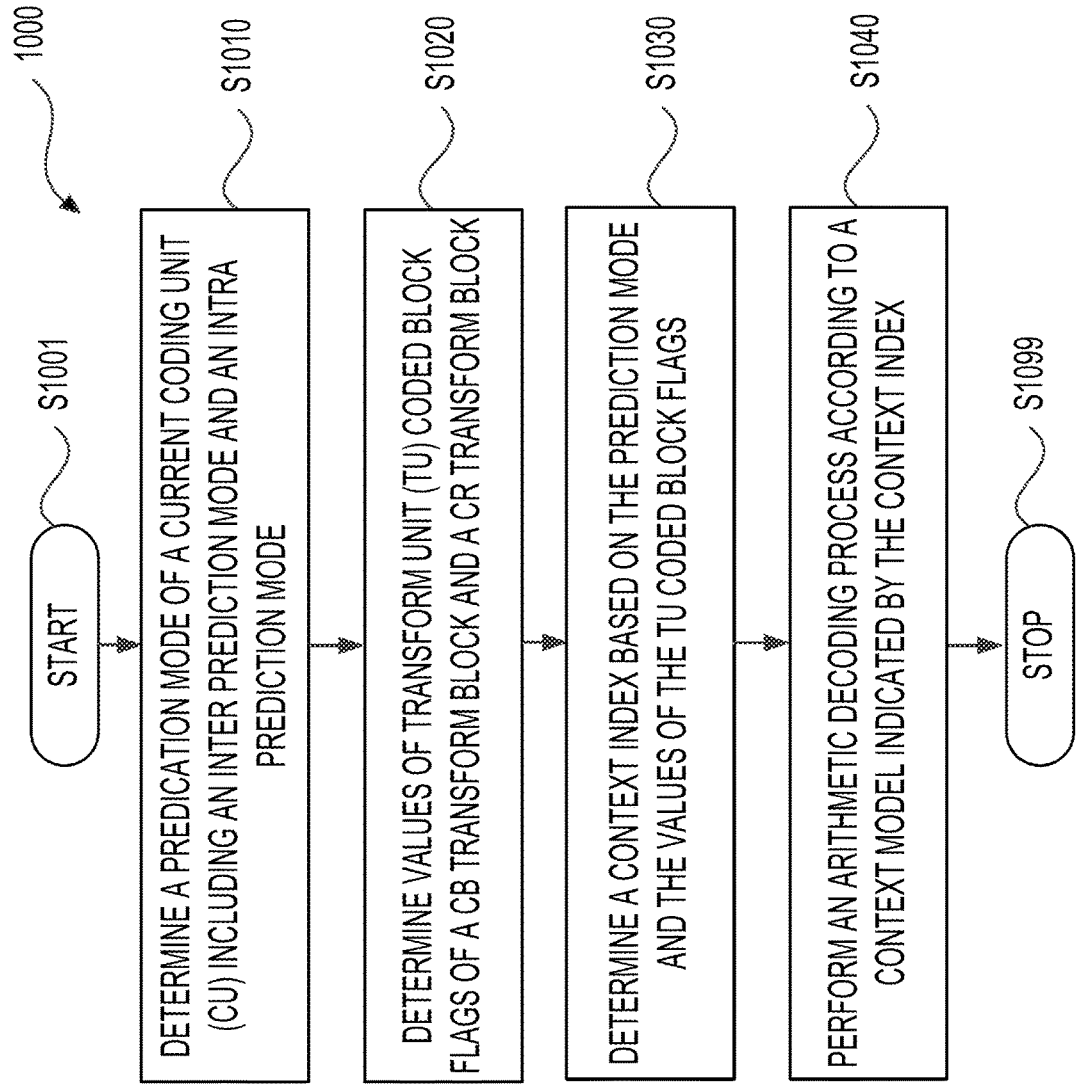
FIG. 10 shows a flow chart outlining a decoding process (1000) according to an embodiment of the disclosure.

FIG. 10 shows a flow chart outlining a decoding process (1000) according to an embodiment of the disclosure. By performing the process (1000), a TU level JCCR activation flag can be parsed from a bitstream. According to the TU level JCCR activation flag, residual blocks of Cb and Cr chroma components can be determined for a block under reconstruction. In various embodiments, the process (1000) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a prediction mode of a current CU can be determined. The prediction mode can include an inter prediction mode and an intra prediction mode. For example, a prediction mode flag indicating whether the current coding unit is coded in the inter prediction mode or the intra prediction mode can be received in a bitstream. Or, when the prediction mode is not present in the bitstream, a value of the prediction mode flag can be inferred. When the current CU is coded with an IBC mode or a CIIP mode, the current CU is treated as being coded with an intra prediction mode in an embodiment.

At (S1020), values of CBFs of the current CU can be determined. Each of the Cb and Cr CBFs can have a value of 1 or zero. For example, a TU coded block flag of a Cb transform block, denoted tu_cbf_cb, can be received or inferred. The tu_cbf_cb can indicate whether the Cb transform block contains one or more transform coefficient levels not equal to zero. For example, a TU coded block flag of a Cr transform block, denoted tu_cbf_cr, can be received or inferred. The tu_cbf_cr can indicate whether the Cr transform block contains one or more transform coefficient levels not equal to 0.

At (S1030), a context index, denoted ctxIdx, can be determined based on the prediction mode of the current CU and the values of the tu_cbf_cb, and the tu_cbf_cr. For example, the context index can be determined according to one of the following (1)-(4) sets of expressions:

ctxIdx=(2*tu_cbf_cb+tu_cbf_cr-1)+3*(isIntra?0:1), (1)

cbfCbCr=2*tu_cbf_cb+tu_cbf_cr, ctxIdx=
(cbCbCr==3)?0:(cbfCbCr+2*(isIntra?0:1)), (2)

cbfCbCr=2*tu_cbf_cb+tu_cbf_cr, ctxIdx=
(cbfCbCr==3)?0:((isIntra?cbfCbCr: 3)), and (3)

cbfbCr=2*tu_cbf_cb+tu_cbf_cr, ctxIdx=
(cbfCbCr==3)?0:(isIntra?1:2)), (4)

where isIntra represents a Boolean value that is true when the current CU is coded with the intra prediction mode, and false when the current CU is coded with the inter prediction mode.

At (S1040), an arithmetic decoding process can be performed according to a context model indicated by the ctxIdx determined at (S1030). During the arithmetic decoding process, a bin of a joint Cb Cr residual (JCCR) flag can be parsed from the bitstream that indicate whether a JCCR mode is applied (whether residual samples for both Cb and Cr chroma components of the current CU are coded as a single transform block). When the JCCR flag indicates the JCCR mode is applied to the current CU, the Cb and Cr residual blocks of the current CU can be reconstructed based on the single transform block, for example, in a way as described in Table 1. When the JCCR flag indicates no JCCR mode is used, the Cb and Cr residual blocks of the current CU can be obtained separately. The process 1000 can proceed to (S1099), and terminate at (S1099).

Figure 11:
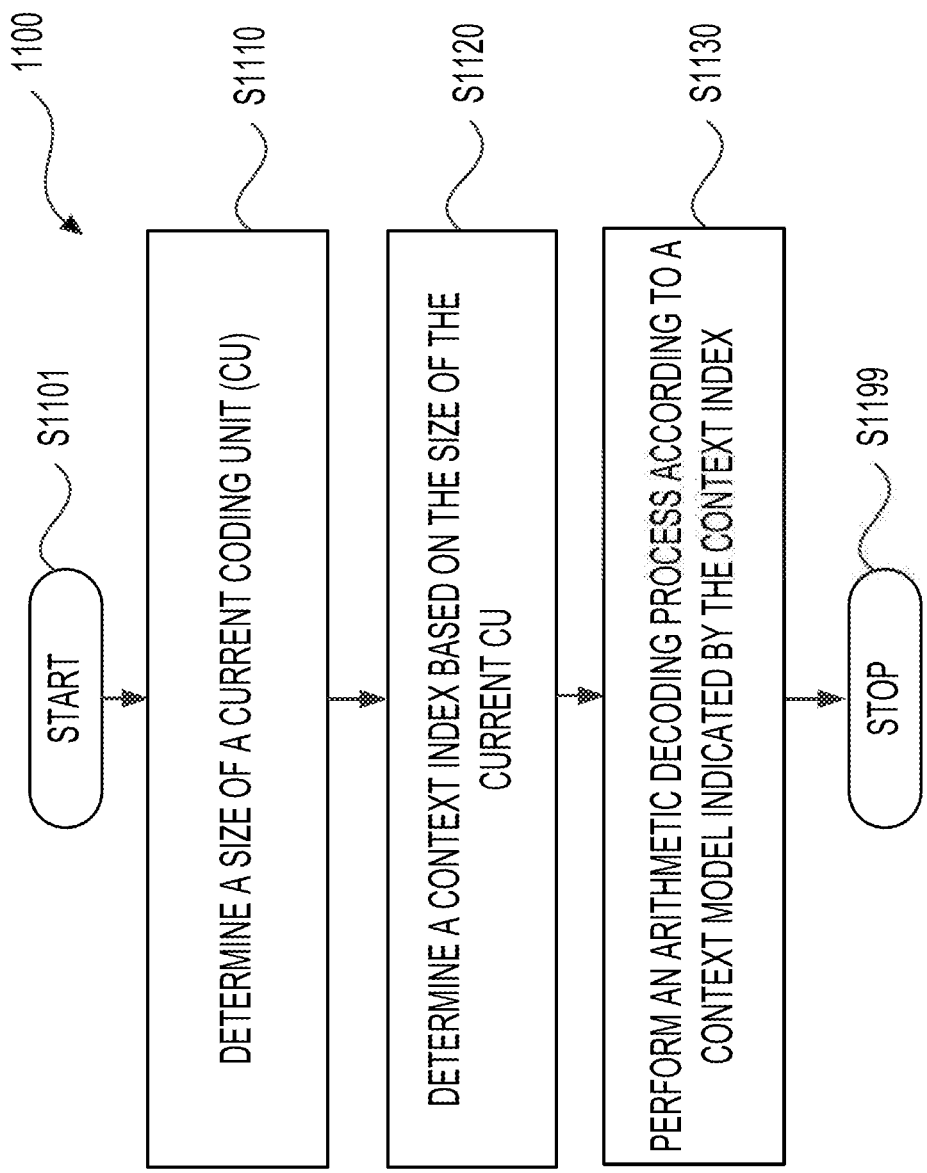
FIG. 11 shows a flow chart outlining a decoding process (1100) according to an embodiment of the disclosure.

FIG. 11 shows a flow chart outlining a decoding process (1100) according to an embodiment of the disclosure. By performing the process (1100), a TU level JCCR activation flag can be parsed from a bitstream. According to the TU level JCCR activation flag, residual blocks of Cb and Cr chroma components can be determined for a block under reconstruction. In various embodiments, the process (1100) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a size of a current CU can be determined based on one or more syntax elements received in a bitstream. For example, the one or more syntax element parsed from the bitstream can indicate a width, a height, or an area of the current CU, for example, in number of samples. The size of the current CU can be represented by the block width, the block height, a block area size (e.g., the block width multiplying the block height), a sum of the block width and the block height, a maximum of the block width and the block height, or a minimum of the block width and the block height of the current CU.

At (S1120), a context index, denoted ctxIdx, can be determined based on the size of the current CU. In an example, a size threshold is used. A ctxIdx of a first context model is used when the block size of the current CU is smaller than the threshold. Another ctxIdx of a second context model is used when the block size of the current CU is greater than the threshold.

In an example, the context model is determined based on the size of the current CU as well as CFs of the current CU. For example, the context index can be determined according to $$\text{ctxIdx}=(2*tu\_cbf\_cb+tu\_cbf\_cr-1)+3*(\text{blockSize}<K?0:1),$$

where blocksize represents the size of the current CU, and K represents a threshold and is a positive integer.

At (S1130), an arithmetic decoding process can be performed according to a context model indicated by the ctxIdx determined at (S1120). During the process, a bin of a JCCR flag can be determined that indicates whether residual samples for both chroma components Cb and Cr of the current CU are coded as a single transform block. Based on the JCCR flag, residual blocks of Cb and Cr chroma components of the current CU can be derived subsequently. The process 1100 can proceed to (S1199) and terminate at (S1199).

V. Computer System

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
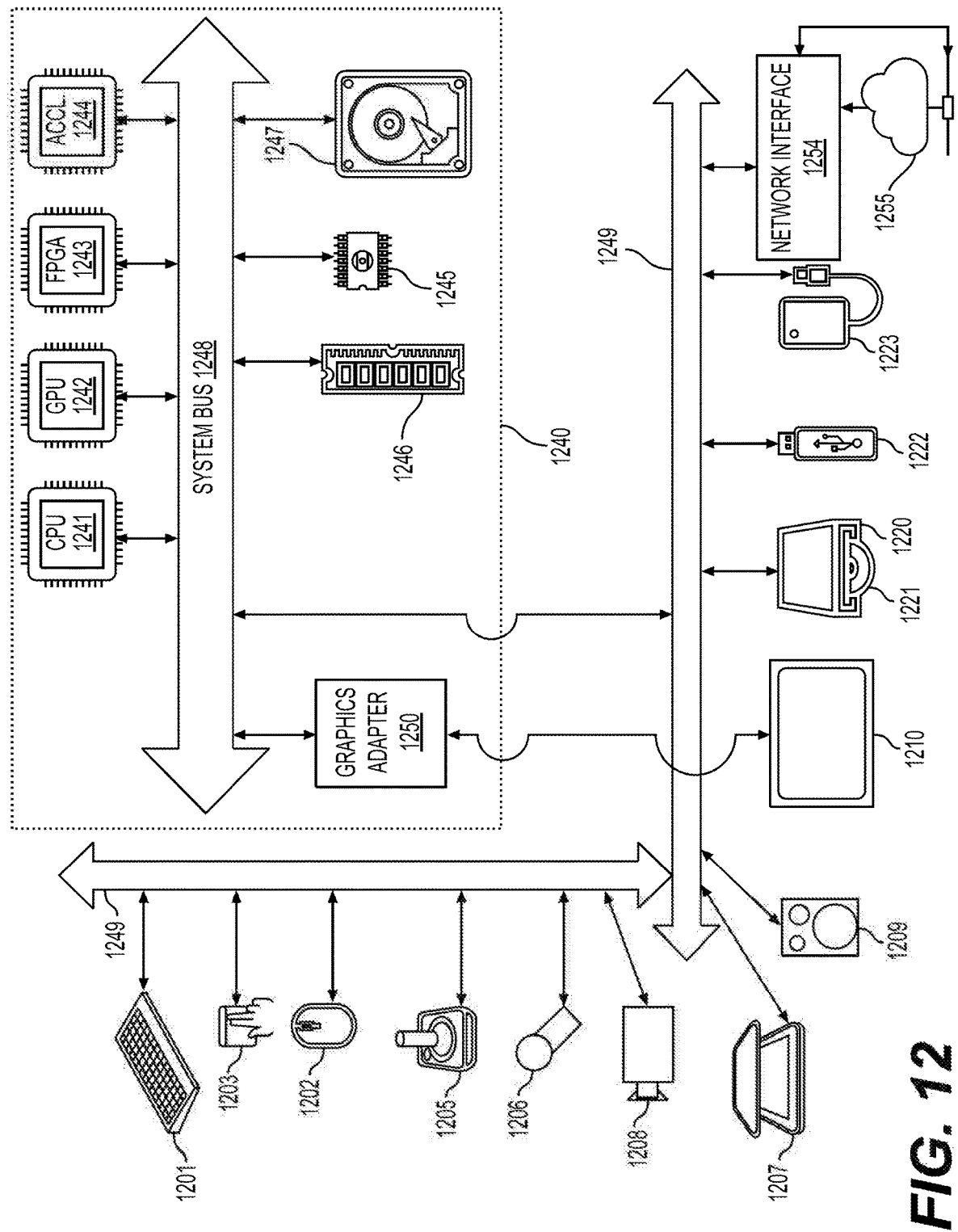
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speaker (1209), headphones (not depicted)), visual output devices (such as screens (1210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (125). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249)(such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (~~50) and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
BDPCM: Block Differential Pulse-code Modulation
BMS: benchmark set
CANBus: Controller Area Network Bus
CB: Coding Block
CD: Compact Disc
CIIP: Combined Intra and Inter Prediction
CPUs: Central Processing Units
CRT: Cathode Ray Tube
CTBs: Coding Tree Blocks
CTU: Coding Tree Unit
CU: Coding Unit
DPCM: Differential Pulse-code Modulation
DVD: Digital Video Disc
EP: Equal Probability
FPGA: Field Programmable Gate Areas
GOPs: Groups of Pictures
GPUs: Graphics Processing Units
GSM: Global System for Mobile communications
HDR: high dynamic range
HEVC: High Efficiency Video Coding
HRD: Hypothetical Reference Decoder
IBC: Intra Block Copy
IC: Integrated Circuit
JCCR: Joint Cb and Cr Residue Coding (or Joint Chroma Residue Coding)
JEM: joint exploration model LAN: Local Area Network
LCD: Liquid-Crystal Display
LTE: Long-Term Evolution
MV: Motion Vector
OLED: Organic Light-Emitting Diode
PBs: Prediction Blocks
PCI: Peripheral Component Interconnect
PLD: Programmable Logic Device
PUs: Prediction Units
QP: quantization parameter
RAM: Random Access Memory
RD: Rate-distortion
RDOQ: Rate-distortion Optimized Quantization
ROM: Read-Only Memory
SCC: Screen Content Coding
SDR: standard dynamic range
SEI: Supplementary Enhancement Information
SNR: Signal Noise Ratio
SSD: solid-state drive
TSM: Transform Skip Mode
TUs: Transform Units,
USB: Universal Serial Bus
VTM: VVC Test Mode
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:
   determining a prediction mode of a current coding unit (CU), the prediction mode including an inter prediction mode and an intra prediction mode;
   determining values of the following syntax elements of the current CU:
      a transform unit (TU) coded block flag of a Cb transform block, denoted tu_cbf_cb, indicating whether the Cb transform block contains one or more transform coefficient levels not equal to zero, and
      a TU coded block flag of a Cr transform block, denoted tu_cbf_cr, indicating whether the Cr transform block contains one or more transform coefficient levels not equal to 0;
   determining a context index, denoted ctxIdx, based on the prediction mode of the current CU and the values of the tu_cbf_cb, and the tu_cbf_cr; and
   performing an arithmetic decoding process according to a context model indicated by the ctxIdx to determine a bin of a joint Cb Cr residual (JCCR) flag indicating whether residual samples for both Cb and Cr chroma components of the current CU are coded as a single transform block.

2. The method of claim 1, wherein the current CU is coded in the inter prediction mode, one of the Cb transform block and the Cr transform block contains transform coefficient levels that are all zero, and the residual samples for both the Cb and Cr chroma components of the current CU are coded as the single transform block.

3. The method of claim 1, wherein the determining the prediction mode of the current CU includes:
   receiving or inferring a prediction mode flag indicating whether the current coding unit is coded in the inter prediction mode or the intra prediction mode.

4. The method of claim 1, wherein the determining the prediction mode of the current CU includes:
   determining the prediction mode of the current CU to be the intra prediction mode in response to that the current CU is coded with an intra block copy (IBC) mode, or a combined intra and inter prediction (CIIP) mode.

5. The method of claim 1, wherein the determining values of the syntax elements of the current CU includes:
   receiving or inferring the TU coded block flag of the Cb transform block or the Cr transform block.

6. The method of claim 1, wherein the determining the context index includes:
   determining the context index according to one of the following (1)-(4) sets of expressions:

$$\text{ctxIdx}=(2*tu\_cbf\_cb+tu\_cbf\_cr-1)+3*(\text{isIntra?0:1}), \quad (1)$$

$$\text{cbfCbCr}=2*tu\_cbf\_cb+tu\_cbf\_cr, \text{ctxIdx}= \\ (\text{cbfCbCr}==3)?0:(\text{cbfCbCr}+2*(\text{isIntra?0:1})), \quad (2)$$

$$\text{cbfCbCr}=2*tu\_cbf\_cb+tu\_cbf\_cr, \text{ctxIdx}= \\ (\text{cbfCbCr}==3)?0:((\text{isIntra?cbfCbCr: 3})), \text{ and} \quad (3)$$

$$\text{cbfbCr}=2*tu\_cbf\_cb+tu\_cbf\_cr, \text{ctxIdx}= \\ (\text{cbfCbCr}==3)?0:(\text{isIntra?1:2})), \quad (4)$$

where isIntra represents a Boolean value that is true when the current CU is coded with the intra prediction mode, and false when the current CU is coded with the inter prediction mode.

7. The method of claim 1, wherein the determining the context index includes:
   determining the context index based on decoded information of a neighboring block of the current CU.

8. The method of claim 7, wherein the decoded information of the neighboring block of the current CU includes one or more of,
   a prediction mode of the neighboring block,
   a TU coded block flag of a Cb transform block of the neighboring block,
   a TU coded block flag of a Cb transform block of the neighboring block, or a size of the neighboring block.

9. A method of video decoding at a video decoder, comprising:
   determining a size of a current coding unit (CU);
   determining a context index, denoted ctxIdx, based on the size of the current CU; and
   performing an arithmetic decoding process according to a context model indicated by the ctxIdx to determine a bin of a joint Cb Cr residual (JCCR) flag indicating whether residual samples for both chroma components Cb and Cr of the current CU are coded as a single transform block.

10. The method of claim 9, wherein the size of the current CU is represented by one of,
   a block width of the current CU,
   a block height of the current CU,
   a block area size of the current CU,
   a sum of the block width and the block height of the current CU,
   a maximum of the block width and the block height of the current CU, or
   a minimum of the block width and the block height of the current CU.

11. The method of claim 9, wherein the determining the context index based on the size of the current CU includes:

using a first context model when the block size of the current CU is smaller than a threshold; and using a second context model when the block size of the current CU is greater than the threshold.

12. The method of claim 9, wherein the determining the context index based on the size of the current CU includes:
deriving the context index based on:
the size of the current CU,
a transform unit (TU) coded block flag of a Cb transform block, denoted tu_cbf_cb, of the current CU indicating whether the Cb transform block contains one or more transform coefficient levels not equal to zero, and
a TU coded block flag of a Cr transform block, denoted tu_cbf_cr, of the current CU indicating whether the Cr transform block contains one or more transform coefficient levels not equal to 0.

13. The method of claim 12, wherein the deriving the context index includes:
deriving the context index according to $$ctxIdx=(2*tu\_cbf\_cb+tu\_cbf\_cr-1)+3*(blockSize<K?0:1),$$

where blocksize represents the size of the current CU, and K represents a threshold and is a positive integer.

14. A non-transitory computer-readable medium storing instructions that, when executed by a processor, cause the processor to perform a method, the method comprising:
determining a prediction mode of a current coding unit (CU), the prediction mode including an inter prediction mode and an intra prediction mode;
determining values of the following syntax elements of the current CU:
a transform unit (TU) coded block flag of a Cb transform block, denoted tu_cbf_cb, indicating whether the Cb transform block contains one or more transform coefficient levels not equal to zero, and
a TU coded block flag of a Cr transform block, denoted tu_cbf_cr, indicating whether the Cr transform block contains one or more transform coefficient levels not equal to 0;
determining a context index, denoted ctxIdx, based on the prediction mode of the current CU and the values of the tu_cbf_cb, and the tu_cbf_cr; and
performing an arithmetic decoding process according to a context model indicated by the ctxIdx to determine a bin of a joint Cb Cr residual (JCCR) flag indicating whether residual samples for both Cb and Cr chroma components of the current CU are coded as a single transform block.

15. The non-transitory computer-readable medium of claim 14, wherein the current CU is coded in the inter prediction mode, one of the Cb transform block and the Cr transform block contains transform coefficient levels that are all zero, and the residual samples for both the Cb and Cr chroma components of the current CU are coded as the single transform block.

16. The non-transitory computer-readable medium of claim 14, wherein the determining the prediction mode of the current CU includes:
receiving or inferring a prediction mode flag indicating whether the current coding unit is coded in the inter prediction mode or the intra prediction mode.

17. The non-transitory computer-readable medium of claim 14, wherein the determining the prediction mode of the current CU includes:
determining the prediction mode of the current CU to be the intra prediction mode in response to that the current CU is coded with an intra block copy (IBC) mode, or a combined intra and inter prediction (CIIP) mode.

18. The non-transitory computer-readable medium of claim 14, wherein the determining values of the syntax elements of the current CU includes:
receiving or inferring the TU coded block flag of the Cb transform block or the Cr transform block.

19. The non-transitory computer-readable medium of claim 14, wherein the determining the context index includes:
determining the context index according to one of the following (1)-(4) sets of expressions:

$$ctxIdx=(2*tu\_cbf\_cb+tu\_cbf\_cr-1)+3*(isIntra?0:1), \quad (1)$$

$$cbfCbCr=2*tu\_cbf\_cb+tu\_cbf\_cr, ctxIdx= (cbfCbCr==3)?0:(cbfCbCr+2*(isIntra?0:1)), \quad (2)$$

$$cbfCbCr=2*tu\_cbf\_cb+tu\_cbf\_cr, ctxIdx= (cbfCbCr==3)?0:((isIntra?cbfCbCr: 3)), \text{ and} \quad (3)$$

$$cbfbCr=2*tu\_cbf\_cb+tu\_cbf\_cr, ctxIdx= (cbfCbCr==3)?0:(isIntra?1:2)), \quad (4)$$

where isIntra represents a Boolean value that is true when the current CU is coded with the intra prediction mode, and false when the current CU is coded with the inter prediction mode.

20. The non-transitory computer-readable medium of claim 14, wherein the determining the context index includes:
determining the context index based on decoded information of a neighboring block of the current CU.

* * * * *